United States Patent [19]
Kriege

[11] 3,962,702
[45] June 8, 1976

[54] OPTICAL FIBER DISPLAY DEVICE

[75] Inventor: Wolfgang Kriege, Mainz, Germany

[73] Assignee: Jenaer Glaswerk Schott & Gen., Mainz, Germany

[22] Filed: Feb. 19, 1975

[21] Appl. No.: 551,143

[30] Foreign Application Priority Data
Mar. 1, 1974  Germany .................. 7407095[U]
Aug. 5, 1974  Germany .................. 2437580

[52] U.S. Cl. .............................. 340/380; 350/96 C
[51] Int. Cl.² ...................... G08B 5/00; G02B 9/14
[58] Field of Search .......... 340/380, 324; 350/96 B, 350/96 C; 250/227; 179/DIG. 2; 40/130 K; 240/1 EL

[56] References Cited
UNITED STATES PATENTS

| | | | |
|---|---|---|---|
| 2,589,569 | 3/1952 | Peter et al. ........................ | 340/380 |
| 2,672,288 | 3/1954 | Perrin ............................. | 350/96 B X |
| 2,992,587 | 7/1961 | Hicks et al. ....................... | 350/96 BC UX |
| 3,874,780 | 4/1975 | Love ............................. | 350/96 C X |

*Primary Examiner*—John W. Caldwell
*Assistant Examiner*—William M. Wannisky
*Attorney, Agent, or Firm*—Littlepage, Quaintance, Murphy & Dobyns

[57] ABSTRACT

In order to confine radiation from an optical fiber display device within a specified angle, a light-transmitting cone is provided either at the input or output end of a set of fibers. The cone can be solid or constructed of conical fibers. The input can be filtered or switched.

17 Claims, 5 Drawing Figures

OPTICAL FIBER DISPLAY DEVICE

BACKGROUND OF THE INVENTION

1. Field of the Invention

This invention relates to means for displaying signals and is particularly concerned with a device which includes means whereby letters, numerals or other symbols are displayed.

2. Description of the Prior Art

Conventional signal indicators usually consist of a plurality of lamps arranged to form a pattern, with an optical system used in connection with the lamps to produce the desired reflection characteristics. The lamps are normally connected so that different signals are alternately displayed by different combinations of the lamps.

Some of the disadvantages of these conventional indicators are that they have a low light output, a considerable number of lamps are required, and there are many times when the indicators do not function properly because of lamp failure. Complicated wiring patterns are required, and there is also a possibility that, when lamp failures occur, the indicated signal will be misinterpreted. Each lamp provides a dot of light in the display of the various signals, and thus it is only practical to provide symbols or numerals of uniform color. In mist or fog, problems are encountered as a result of the poor resolution of the signal, and limitations on the size of the signal indicator are imposed by the dimensions of the lamps.

Light-transmitting fibers have been used for the display of symbols on indicator surfaces and are illustrated in German Pat. Nos. 2,126,672 and 2,245,460. However, in these arrangements, the intensity of the light issuing from the ends of the light-transmitting fibers has been insufficient both with regard to the total light intensity and also with regard to the intensity of the light within a selected angle of radiation.

SUMMARY OF THE INVENTION

The invention provides an improved signal display means. According to the invention, light-transmitting cones are provided at the ends of the light-transmitting fibers or at the ends of the bundles of fibers whereby the emitted radiation is confined within a specified angle.

BRIEF DESCRIPTION OF THE DRAWINGS

The invention will now be described by way of example with reference to the accompanying drawings.

DESCRIPTION OF THE PREFERRED EMBODIMENTS

Figure 1:
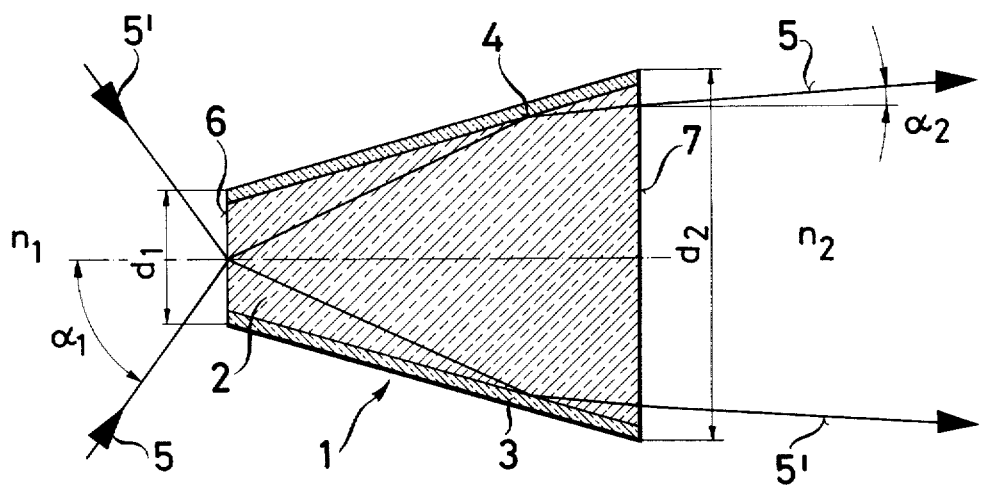
FIG. 1 is a schematic illustration of the paths of light rays passing through a light-transmitting cone in accordance with the invention.

As illustrated in FIG. 1, a light-transmitting cone 1 includes a core 2 formed of a transparent material having a refractive index $n_K$. The core 2 is surrounded by a sleeve 3 formed of a material having a refractive index $n_M$ which is less than $n_K$. Substantially total reflection of the light rays within the cone 1 is achieved at the interface 4 between the core 2 and the sleeve 3.

FIG. 1 shows two light rays 5 and 5' passing through a medium having a refractive index $n_1$ and impinging on the end surface 6 of the cone at an angle $\alpha_1$. This end surface has a diameter $d_1$ and the light rays pass through the cone 1 and issue from the opposite end surface 7 thereof at an angle $\alpha_2$ to the end surface 7. The end surface 7 has a diameter $d_2$ and the medium into which the light rays are emitted has a refractive index $n_2$. The following relationship exists between the entry and exit apertures of an optically insulated cone:

$$n_1 \sin\alpha_1 = \frac{d_2}{d_1} n_2 \sin\alpha_2$$

The maximum inlet aperture $A_{max}$ is determined by the relationship $$A_{max} = n_1 \sin\alpha_{max} = \frac{d_2}{d_1} \sqrt{n_K^2 - n_M^2}$$

The exit of angle $\alpha_2$ of the rays 5 and 5' issuing from the light-transmitting cone 1 can be selected by appropriate selection of the ratio $d_2:d_1$, i.e. by selection of the geometry of the light-transmitting cone. The spacing between the entry surface 6 and the exit surface 7 is immaterial as is the particular configuration of the outer surface of the cone. Only the diameters $d_1$ and $d_2$ of the end surfaces of the cones are important.

It can be seen quite clearly from FIG. 1 that the light rays 5 and 5' at the exit side of the cone 1 are inclined at an angle $\alpha_2$ to the axis of the cone, which is substantially less than the angle $\alpha_1$ at the inlet side of the cone 1.

What is important is not that a change in the profile of the radiated beam should be obtained but that there should be the reduction referred to above in the angle $\alpha_2$ which the light rays make to the axis of the cone at the exit side of the cone as compared with the angle $\alpha_1$ at the inlet side of the cone. As a result, however, the beam of light issuing from the exit surface 7 is effectively more strongly beamed or parallelized than the beam of light impinging on the entry surface 6. This means that there is an increase in the light intensity resulting from a reduction in the angle of the light beam.

One of the characteristics of a light-transmitting fiber is that a light ray which enters one end of the fiber at a given angle to the longitudinal axis of the fiber will, after a series of reflections along the length of the fiber, issue from the other end of the fiber at the same angle to the axis. The angle is controlled whether the light-transmitting cone 1 is placed at the common inlet end of a bundle of fibers or whether individual cones are placed at the exit ends of the separate fibers. Of course, if the latter course is adopted, there is a change in the profile of the beam which is dependent upon the difference in the diameters at the two ends of the cone. It is thus possible to obtain an increase in the cross-sectional area of a light beam, while at the same time reducing the degree of scatter of the beam.

Figure 3:
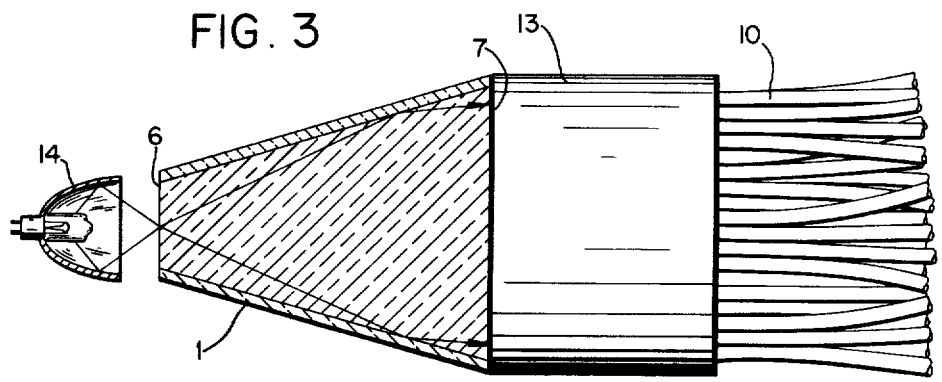
FIG. 3 is a schematic view of a device with such a cone at the input of the fibers.

If the light-transmitting cone is, on the other hand, disposed at the common inlet end of a bundle of light-transmitting fibers as in FIG. 3, the larger diameter surface 7 of the cone 1 will be connected to the fibers and the light from the source will be emitted onto the smaller diameter surface 6. Known forms of optical devices may be employed for concentrating the light beam onto the end surface 6.

Assuming that FIG. 1 represents a longitudinal section of a circular cross-section light-transmitting cone, the light rays 5 and 5' are radiated from the cone at an angle $\alpha_2$ to the axis of the cone throughout the whole of the circular surface 7. However, if it is desired to obtain an emitted beam which is not symmetrical about the axis of the cone 1, it is possible to employ a cone having an end surface 7 of non-circular form. For example, it may be desired that the radiated beam should have a substantial horizontal spread but should be confined in the vertical direction to eye level. In such a case the exit surface 7 of the cone 1 would have a vertical dimension greater than the horizontal dimension thereof. It might even be desirable for the horizontal dimension of the exit surface 7 to be less than the diameter of the entry surface 6. In addition, means may be provided whereby the geometric shape of the exit surface 7 can be completely adjusted in dependence on the particular requirements prevailing at any selected time.

Figure 2:
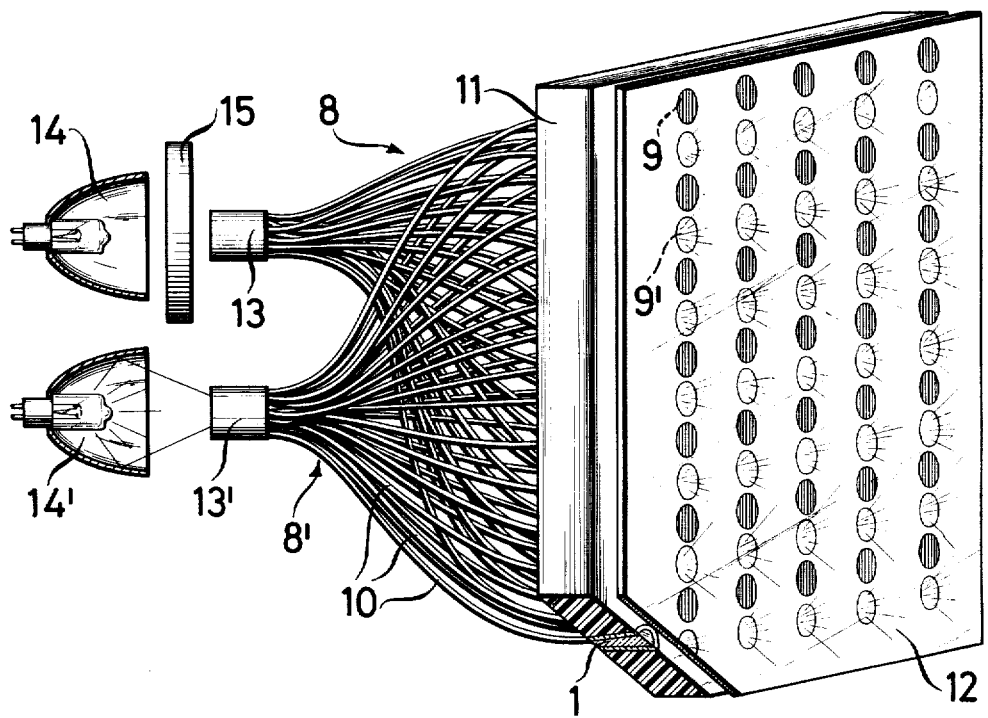
FIG. 2 is a schematic perspective view of a signal display device employing two multi-strand light-transmitting fibers with light-transmitting cones at the output of the fibers.

FIG. 2 illustrates a signal display device, the design of which is such that two signals of different colors can be displayed on one indicator board. The device includes two multi-fiber sets 8 and 8', the individual free ends of which terminate in openings 9 and 9' of a board 11. A circular light-transmitting cone 1 is provided at the free end of each individual fiber 10, the cones 1 being set in the openings 9 and 9' with the exit surfaces 7 of the cones facing outwardly. A flat or convex panel 12 is fitted over the board 11 and serves to protect the end surfaces 7 of the cones 1. The panel 12 may also act as a diffusing lens and cause controlled intermingling of the light beams issuing from the openings 9 and 9'. The panel 12 may also be provided with an anti-reflective coating to counteract any phantom reflections which may occur. Such phantom reflections may occur because of external light (usually sunlight) which can be reflected by the indicator device and can thereby produce a luminous signal without the light source of the device being switched on. Phantom reflections could arise from any of the reflecting surfaces within the device.

In order to reduce the production of phantom reflections and to increase the light output, the light-transmitting cones 1 are optically coupled to the ends of the light-transmitting fibers. That is to say, they are connected using an optical putty or jointing fluid having a refractive index indentical to that of either the fibers 10 or the cones 1 so that the jointing medium does not cause refraction of the light beam passing therethrough.

The bundles of light-transmitting fibers 8 and 8' are illuminated at their common ends 13 and 13' by incandescent lamps 14 and 14'. A color filter 15 is disposed between the lamp 14 and the fiber bundle end 13 so that, when the lamp 14 is switched on, a colored signal is visible from the openings 9. In the example shown in FIG. 2, there is no color filter between the lamp 14' and the fiber bundle end 13' so that, when the lamp 14' is switched on, an uncolored signal is displayed.

Because of the relatively small dimensions of the light-transmitting cones at the ends of the optical fibers, the number of multi-strand fiber sets which are used can be increased considerably to permit the displaying of a variety of symbols on the one indicator board. In addition, several fibers, which are each obtained from different multi-strand fiber sets, can either be connected together to a shared light-transmitting cone or be disposed immediately adjacent one another in the display board with separate light-transmitting cones disposed in abutting relationship.

The light-transmitting cones may be formed as optically insulated conical rods produced from an optically transparent material. It is important that the material forming the cones should have good light-transmitting characteristics and that substantially total reflection should take place at the interface 4 between the core 2 and the sleeve 3.

In a arrangement modified from that described above, the light-transmitting cones are themselves each formed from a bundle of light-transmitting fibers, the bundle being disposed so as to form a cone. Since the change in the exit aperture in relation to the entry aperture of the cone depends solely on the ratio of the diameters of the end surfaces of the cone, the light dispersal pattern is the same whether the cone is of solid geometric form or whether the degree of taper thereof is constant throughout its length.

Figure 4:
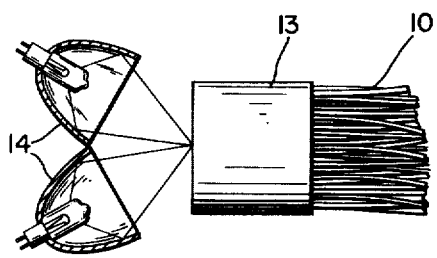
FIG. 4 is a schematic view of the input portion of a device in which plural light sources can be selectively used to illuminate a single bundled end of fibers.

The light-transmitting fibers may be so arranged as in FIG. 4 so that, although several lamps illuminate a signal, each individual lamp, when switched on, will cause illumination of that signal. This arrangement ensures increased operating safety in the event of failure of one or more of the lamps and facilitates controlled adjustment of the signal light intensity according to the degree of illumination of the surroundings. Thus, in bright sunlight, more lamps will be switched on than will be required on a dull day.

Figure 5:
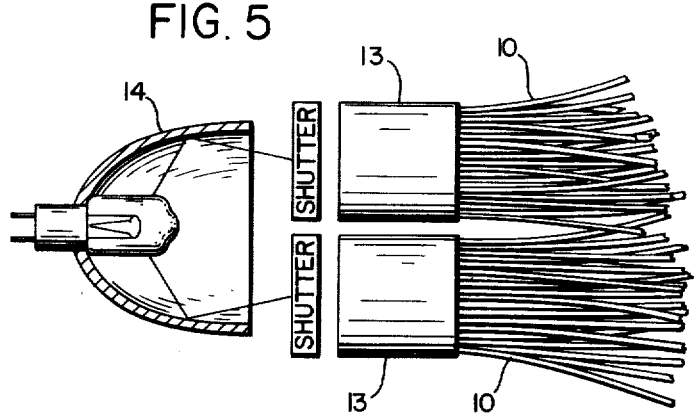
FIG. 5 is a schematic view of the input portions of a device in which a single light source can be used selectively to illuminate the bundled ends of a plurality of sets of conductors.

There is also the possibility that a single lamp can be arranged for alternative illumination of a plurality of different signals, as in FIG. 5, selection of the signal required to be illuminated being effected either optically or mechanically, as by shutters. Color filters can be used for the transmission either of multi-colored signals or of signals of different colors by appropriate selection of the required filters. Coloration may be achieved either by the provision of additional elements for the signal display means of by appropriate pigmentation or other color treatment of one of the optical components of the signal display means.

What is claimed is:
1. Signal display means comprising
   A. a multi-strand set of light conductors comprising light-transmitting fibers, each light conductor having two ends, the set of light conductors being arranged to have a first end of each of the light conductors bundled together and being arranged to have a second end of each of the light conductors separated to be free of the other light conductors in the set, a second end of each light conductor being arranged in a display matrix, and
   B. light-transmitting cone means comprising at least one light-transmitting cone, the cone means being optically attached to one end of each of the light conductors.

2. Display means according to claim 1, wherein the light-transmitting cone means is coupled optically to the light conductors.

3. Display means according to claim 2, wherein the at least one light-transmitting cone comprises an optically insulated, conical element formed of an optically transparent material.

4. Display means according to claim 2, wherein the at least one light-transmitting cone comprises conical light-transmitting fibers.

5. Display means according to claim 1, wherein the display matrix is provided with a coating to reduce reflection.

6. Display means according to claim 1, wherein each said second end of the light conductors is provided with its own light-transmitting cone to form an element of the display matrix.

7. Display means according to claim 1, wherein said first ends of the light conductors are bundled and are provided with a shared light-transmitting cone at the bundled end.

8. Display means according to claim 1, further comprising a plurality of light sources arranged to illuminate the bundled end of a multi-strand light conductor set.

9. Display means according to claim 1, comprising a plurality of multi-strand light conductor sets, and separate light sources for illuminating the bundled ends of said conductors.

10. Display means according to claim 1, comprising a plurality of multi-strand light conductor sets, and a single light source for illuminating the bundled ends of said conductors.

11. Display means according to claim 1, further comprising a panel fitted over the exposed ends of the photoconductive cones.

12. Display means according to claim 11 wherein the panel has anti-reflection characteristics.

13. Display means according to claim 11, wherein the panel had diffusing characteristics.

14. A signal display device comprising
A. a plurality of light-transmitting conductors, each conductor having first and second ends, the first end of each conductor being bundled together with a corresponding first end of each of the other conductors to form a bundled end, the second end of each conductor being separated to be free of the corresponding second ends of the other conductors,
B. a board with two sides and having a matrix of openings therein,
C. a plurality of light-transmitting cones, each cone having a smaller end and a larger end, each cone comprising a conical core of transparent material of refractive index $n_K$ surrounded by a sleeve of material having a refractive index $n_M$, where $n_M$ is less than $n_K$, the cones being set in the respective openings in the board with the smaller end of each cone facing one side of the board and the larger end of each cone facing the other side of the board,
D. means for optically coupling the second end of each of the conductors to a corresponding one of the plurality of cones on its smaller end,
E. an anti-reflective panel fitted over said other side of the board to protect the larger ends of the plurality of cones and to prevent phantom reflections, and
F. light means for directing light into the bundled end of the conductors.

15. A device according to claim 14, further comprising:
A. a second plurality of light-transmitting cones fitted into an additional matrix of openings in said board,
B. a second plurality of light conductors having first and second ends and having their first ends bundled to form a second bundled end and having their respective second ends free and respectively optically coupled to the second plurality of cones,
C. second light means for directing light into the second bundled end, and
D. colored filter means placed between the second light means and the second bundled end.

16. A signal display device comprising:
A. a plurality of light conductors comprising light-transmitting fibers, each conductor having first and second ends, the first end of each conductor being bundled together with a corresponding first end of each of the other conductors to form a bundled end, the second end of each conductor being separated to be free of the corresponding second ends of the other conductors,
B. a board with two sides and having a matrix of openings therein,
C. a plurality of light-transmitting cones, each cone having a smaller end and a larger end, each cone comprising a conical core of transparent material of refractive index $n_K$ surrounded by a sleeve of material having a refractive index $n_M$, where $n_M$ is less than $n_K$, the cones being set in the respective openings in the board with the smaller end of each cone facing one side of the board and the larger end of each cone facing the other side of the board,
D. means for optically coupling the second end of each of the conductors to a corresponding one of the plurality of cones on its smaller end,
E. an anti-reflective panel fitted over said other side of the board to protect the larger ends of the plurality of cones and to prevent phantom reflections,
F. light means for directing light into the bundled end of the conductors,
G. a second plurality of light-transmitting cones fitted into an additional matrix of openings in said board,
H. a second plurality of conductors having first and second ends and having their first ends bundled to form a second bundled end and having their respective second ends free and respectively optically coupled to the second plurality of cones,
I. second light means for directing light into the second bundled end, and
J. colored filtered means placed between the second light means and the second bundled end.

17. A signal display device comprising:
A. a plurality of light-transmitting conductors, each conductor having first and second ends, the first end of each conductor being bundled together with a corresponding first end of each of the other conductors to form a bundled end, the second end of each conductor being separated to be free of the corresponding second ends of the other conductors,
B. a board with two sides and having a matrix of openings therein,
C. a plurality of light-transmitting cones, each cone having a smaller end and a larger end, each cone comprising a conical core of transparent material of refractive index $n_K$ surrounded by a sleeve of material having a refractive index $n_M$, where $n_M$ is less than $n_K$, the cones being set in the respective openings in the board with the smaller end of each cone facing one side of the board and the larger end of each cone facing the other side of the board, D. means for optically coupling the second end of each of the conductors to a corresponding one of the plurality of cones on its smaller end, and E. light means for directing light into the bundled end of the conductors.

* * * * *